(12) United States Patent
Rotulo

(10) Patent No.: US 9,543,753 B2
(45) Date of Patent: Jan. 10, 2017

(54) PROTECTION DEVICE FOR ELECTRICAL APPLIANCES, IN PARTICULAR ELECTRIC MOTORS, COMPRESSORS AND TRANSFORMERS

(71) Applicant: Electrica S.r.l., Milan (IT)

(72) Inventor: Fabrizio Rotulo, Naples (IT)

(73) Assignee: Electrica S.r.l., Milan (IT)

( * ) Notice: Subject to any disclaimer, the term of this patent is extended or adjusted under 35 U.S.C. 154(b) by 62 days.

(21) Appl. No.: 14/574,682

(22) Filed: Dec. 18, 2014

(65) Prior Publication Data

US 2015/0180222 A1 Jun. 25, 2015

(30) Foreign Application Priority Data

Dec. 19, 2013 (IT) .................. MI2013A2139

(51) Int. Cl.
*H02H 5/04* (2006.01)
*H02H 7/08* (2006.01)
*H01H 37/14* (2006.01)
*H01H 37/54* (2006.01)
*H01H 37/60* (2006.01)

(52) U.S. Cl.
CPC ............ *H02H 5/041* (2013.01); *H01H 37/14* (2013.01); *H02H 7/08* (2013.01); *H01H 37/5418* (2013.01); *H01H 37/5436* (2013.01); *H01H 37/60* (2013.01)

(58) Field of Classification Search
CPC ............ H01L 2924/15787; H01L 2924/01047; H01L 21/324; H01L 2224/05599; H01L 27/101; H02J 7/0063; H02J 2007/0037; H02J 7/007; B60L 2240/545; B60L 2240/547; H01H 47/325; H01H 2037/768; H01H 37/761; H01H 11/00; H01H 37/5418; H01H 2037/046
See application file for complete search history.

(56) References Cited

U.S. PATENT DOCUMENTS

| 5,105,178 A * | 4/1992 | Krumme ................ H01R 4/01 337/140 |
| 5,864,278 A * | 1/1999 | Becher ............... H01H 37/5427 337/343 |
| 6,204,747 B1 * | 3/2001 | Kitchens .............. H01H 37/761 337/407 |
| 6,249,210 B1 * | 6/2001 | Hofsass ................ H01H 1/504 337/324 |
| 6,914,416 B2 * | 7/2005 | Thomas ................ H02H 9/042 257/712 |
| 6,948,846 B2 * | 9/2005 | Engel ...................... G01K 3/14 361/42 |

(Continued)

FOREIGN PATENT DOCUMENTS

| EP | 0 090 491 A2 | 10/1983 |
| EP | 2 287 878 A1 | 2/2011 |

(Continued)

*Primary Examiner* — Marlon Fletcher
(74) *Attorney, Agent, or Firm* — Ice Miller LLP

(57) ABSTRACT

A protection device is provided for electric appliances suitable for selectively connecting an electric appliance to a power supply line. The protection device includes a metal plate member, a composite metal blade, an insulating block for supporting the metal plate member and the composite metal blade, and a compensating resistor made en bloc with the metal plate member.

11 Claims, 4 Drawing Sheets

(56) References Cited

U.S. PATENT DOCUMENTS

| | | | | |
|---|---|---|---|---|
| 7,059,769 B1* | 6/2006 | Potega | ................ | B60L 11/1861 |
| | | | | 338/22 R |
| 8,174,353 B2* | 5/2012 | Jeong | .................... | H01C 1/022 |
| | | | | 338/20 |
| 2001/0012732 A1* | 8/2001 | Kitchens | .............. | H01H 37/761 |
| | | | | 439/620.31 |
| 2011/0013330 A1* | 1/2011 | Crevenat | ................ | H01H 83/10 |
| | | | | 361/115 |
| 2012/0194315 A1* | 8/2012 | Matthiesen | .......... | H01H 37/761 |
| | | | | 337/142 |
| 2012/0194317 A1* | 8/2012 | Vranicar | .............. | H01H 37/761 |
| | | | | 337/401 |
| 2012/0194958 A1* | 8/2012 | Matthiesen | .......... | H01H 37/761 |
| | | | | 361/103 |
| 2013/0200984 A1* | 8/2013 | Matthiesen | .......... | H01H 37/761 |
| | | | | 337/186 |
| 2013/0299323 A1* | 11/2013 | Tanaka | ................. | H01H 1/2075 |
| | | | | 200/244 |
| 2015/0180222 A1* | 6/2015 | Rotulo | ................... | H02H 5/041 |
| | | | | 361/25 |

FOREIGN PATENT DOCUMENTS

| | | |
|---|---|---|
| GB | 2 280 785 A | 2/1995 |
| WO | WO 2005/078756 A1 | 8/2005 |

* cited by examiner

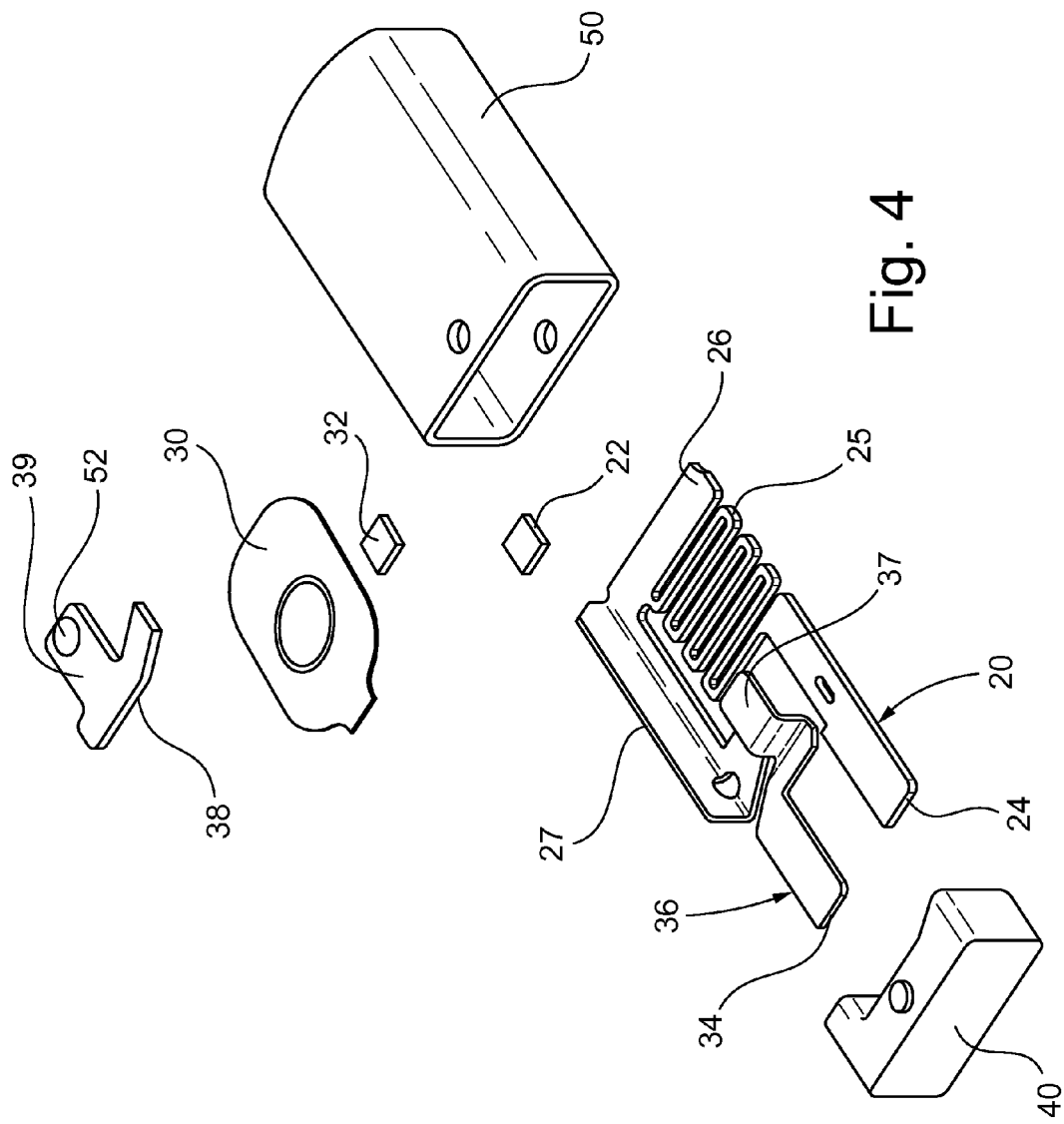

PROTECTION DEVICE FOR ELECTRICAL APPLIANCES, IN PARTICULAR ELECTRIC MOTORS, COMPRESSORS AND TRANSFORMERS

CROSS REFERENCE TO RELATED APPLICATION

This application claims the benefit of and incorporates by reference herein the disclosure of Italian Patent Application No. MI2013A 002139, filed Dec. 19, 2013.

BACKGROUND OF THE DISCLOSED EMBODIMENTS

The present invention refers to a protection device for electrical appliances, in particular electric motors compressors and transformers.

For the sake of simplicity of the treatise, in the rest of the description we shall refer in a non-limiting manner to electric motors.

As it is known, in order to ensure that electric motors have good operation and last a long time, it is necessary to protect them from overloading that is caused by over-current that can pass through the windings of such motors and the consequent overtemperature that can affect the windings themselves.

Such overloads can substantially occur during the starting phase of the motor or during its steady state operating.

In any case, it is currently known to arrange, in one or more areas of the windings, one or more protection devices that are suitable for selectively connecting the winding to which they are connected to the power supply line.

Generally, in order to protect the windings of the stator and/or of the rotor of an electric motor from overtemperatures, thermostats are used that are configured so as to disconnect such windings from the electric power supply in the case in which the temperature perceived by the thermostats themselves exceeds a threshold value that is considered dangerous for the integrity of the motor.

Such thermostats, however, are not able to ensure a rapid interruption of the power supply in the cases in which the temperature of the windings grows very quickly like, for example, when starting up a motor.

Indeed, in such cases, the room temperature perceived by the thermostats known today due to their thermal inertia is not capable of keeping up with the rapid increase in the temperature of the windings thus resulting to be lower than the latter. In such a way, the disconnection of the supply line can occur when the windings already subjected to overtemperature have been damaged or become burnt.

In order to avoid this drawback or rather to compensate for the thermal inertia of the thermostats, it is possible to use protection devices that are also sensitive to electrical current in which the heat generated by the passing of current by Joule effect is equal to the difference between the temperature of the protection winding and the temperature that is perceived by the thermostat.

The sensitivity to electrical current makes it possible, in particular, to obtain an optimal protection of the motors in the rotor blocking conditions in which room temperature is normally lower than that of the windings.

For such a reason protection devices are known that are capable of disconnecting the electric appliance from the power supply not only when the temperature exceeds a higher temperature than the threshold value, but even when the current exceeds a greater current threshold value.

Such known protection devices generally comprise a fixed metal support for a stationary electrical contact and a bimetallic blade that is provided with a movable electrical contact, which are arranged so that the electric contacts make a switch that is normally closed.

The bimetallic blade used, in detail, is made up of at least two metals having different thermal expansion coefficient and it is shaped so as to snap into a position that is distant with respect to the metal support, in which the electric contacts are disconnected and the switch is thus open, when the temperature it is subjected to exceeds a higher temperature threshold value.

The bimetallic blade is capable of returning into the contact position closing the switch when the temperature it is subjected to falls below a lower temperature threshold value.

In order to make the aforementioned protection devices sensitive also to very small current values, it is known to connect, to the metal blade, an additional heating device i.e. a resistance that is arranged so that the blade itself is sensitive to the heat that is spread by the additional heating device. Indeed, in such a way the heat that is produced by the resistor after even very small current has passed is such as to increase the temperature around the blade beyond the higher threshold value.

The aforementioned protection devices have some drawbacks.

A first drawback lies in the fact that the connection of the resistance of the additional heating device is generally carried out by means of a welding operation, which makes the assembly of the aforementioned protection devices complex and costly.

A second drawback is the fact that such protection devices cannot be easily adapted to the different application scenarios for which they are intended due to the fact that, in order to modify the sensitivity to the temperature/current of the device, it is necessary to change the resistance of the additional heating device by subjecting the bimetallic blade to new welding operations.

Another drawback lies in the fact that the behaviour of such protection devices cannot always be repeated; indeed, the sensitivity of the bimetallic blade to the temperature varies as the distance the resistance of the additional heating device is arranged at varies. This distance can vary from one device to another within a range of values that is set based upon the tolerances of the mounting procedure.

Moreover, it is worth underlining that the electric contacts are subjected to strong wearing following the impact of the blade on the metal support every time the switch passes from the opening position to the closing position. Such wearing, therefore, limits the durability or rather the average life time of the protection device.

One example of a known protection device is described in the patent application EP 0 090 491.

Such a protection device comprises a metal casing that is open, at the top, on the bottom wall of which a bimetallic blade is welded to and that comprises an end portion that is suitable for being used as a terminal. The casing is coupled at the opening with a metal plate that substantially closes the casing itself. Such a metal plate comprises a first end portion that is suitable for being used as a terminal, an intermediate portion that is suitable for making the additional heating device and a second end portion that is suitable for supporting a stationary electrical contact. Between the metal casing and the metal plate there is an insulating gasket that wraps around the lateral portion of the metal plate for the entire length of the plate itself so as to prevent it from coming into contact with the metal casing causing a short-circuit.

In this case the metal plate and therefore also the additional heating device always remain in contact with the insulating gasket. The heat, therefore, is dissipated not only by the additional heating device but also by the insulating gasket which, on the other hand, is always colder than the heating device itself; moreover, the maximum temperature of the additional heating device must be kept below the maximum temperature allowed by the insulating gasket in order to prevent it from becoming burnt. Such circumstances, therefore, represent an obstacle to an efficient heat exchange of the additional heating device towards the blade i.e. to a condition that is essential for a high sensitivity of the protection device.

A need therefore exists for a protection device for electrical appliances, in particular electric motors, compressors and transformers, that has high sensitivity even with low current values and a behaviour that is highly repeatable.

A need also exists for a protection device for electrical appliances that makes it possible to change its sensitivity to temperature and/or to current in a rapid and simple manner.

A need exists for a protection device for electrical appliances that is simple to assemble and that is less expensive with respect to known devices.

A need exists for a protection device for electrical appliances that has an average life time that is greater with respect to known devices.

SUMMARY OF THE DISCLOSED EMBODIMENTS

In an embodiment, a protection device for electric appliances, in particular electric motors, compressors and transformers, suitable for selectively connecting an electric appliance to a power supply line is provided. The protection device includes a metal plate member having at a first end a stationary electrical contact and at a second end a first electric connection terminal. The protection device also includes a composite metal blade having at a first end a movable electrical contact and at a second end a second electric connection terminal, which movable electrical contact makes with said stationary electrical contact an electric switch having an opening position and a closing position. The composite metal blade is configured to deform until snapping from the closing position to the opening position when a temperature of an environment around the composite metal blade exceeds a higher temperature threshold value and is configured to deform until snapping from the opening position to the closing position when the temperature of the environment around the composite metal blade falls below a lower temperature threshold value. The protection device includes an insulating block to support the metal plate member and the composite metal blade. The protection device also includes a compensating resistor made en bloc with the metal plate member between the stationary electrical contact and the first connection terminal, the insulating block being constrained to the metal plate element so that the latter projects cantilevered with respect to the insulating block itself leaving the compensating resistor free.

Other embodiments are also disclosed.

BRIEF DESCRIPTION OF DRAWINGS

The characteristics and the advantages of a protection device for electrical appliances, in particular electric motors, compressors and transformers, according to the present invention shall become clearer from the following description, given as an example and not for limiting purposes, with reference to the attached schematic drawings, in which:

FIG. 4 is an exploded perspective view of the embodiment of FIG. 3.

DETAILED DESCRIPTION OF THE DISCLOSED EMBODIMENTS

Figure 1:
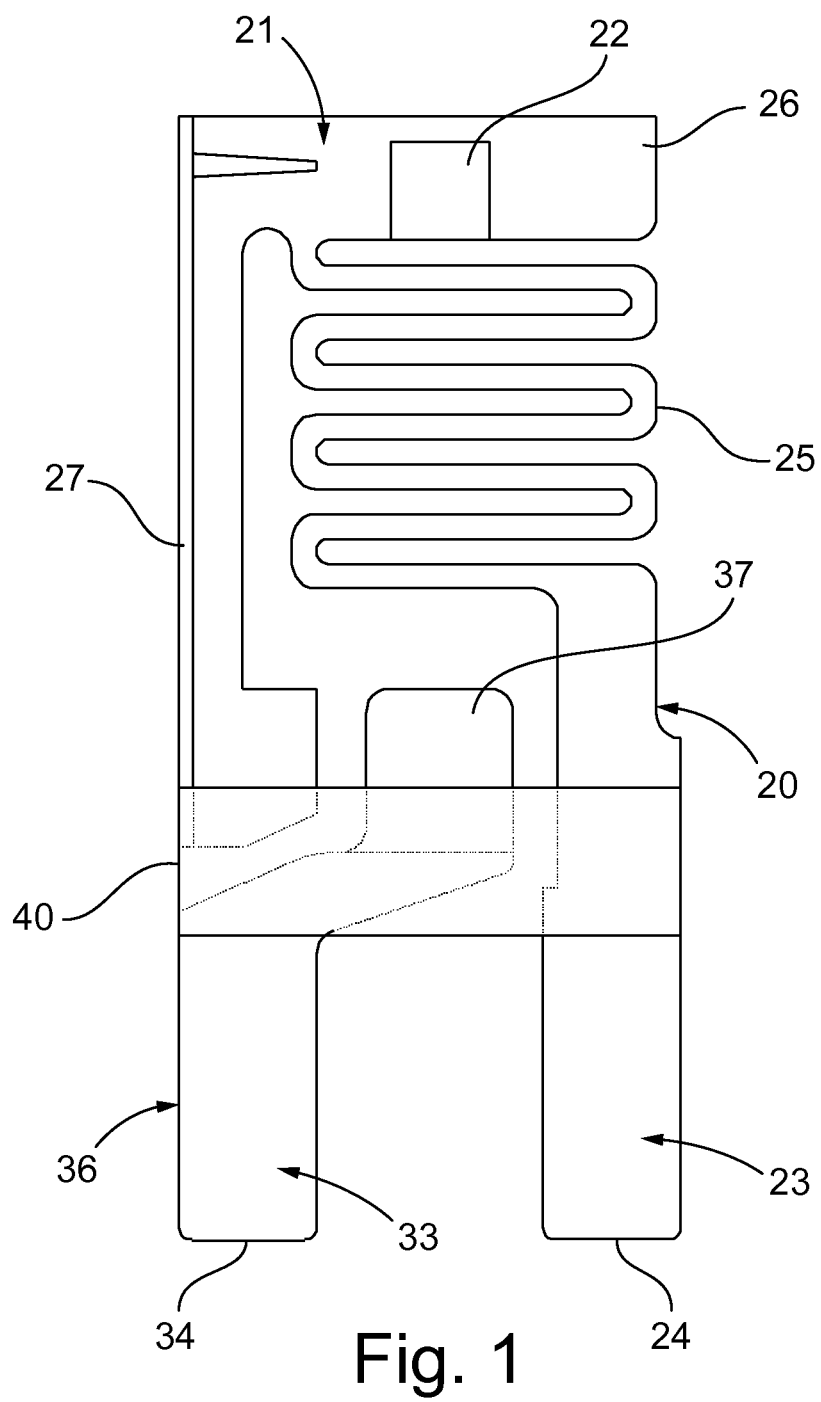
FIG. 1 is a plan view of a metal plate member and a metal supporting member comprised in a protection device for electrical appliances according to an embodiment of the present invention.
Figure 2:
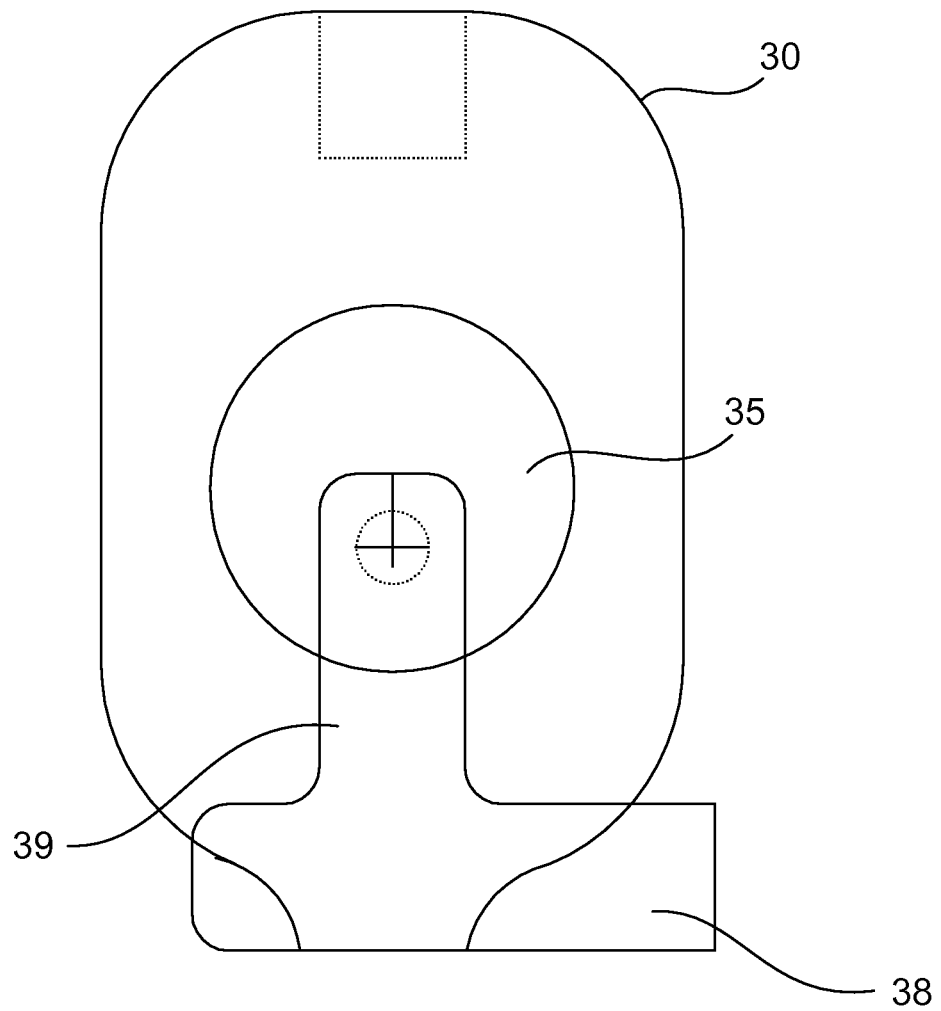
FIG. 2 is a plan view of a composite metal blade that is constrained to an abutment plate that is comprised in a protection device for electrical appliances according to an embodiment of the present invention.

With reference to the figures, these show a protection device for electrical appliances, in particular electric motors, compressors and transformers, wholly indicated with reference numeral 10.

Such a protection device 10 is arranged to selectively connect an electric appliance to a power supply line so as to protect the apparatus from the risks related to overloading of current or temperature.

In detail, the protection device 10 comprises a metal plate member 20 having at a first end 21 a stationary electrical contact 22 and at a second end 23 a first electric connection terminal 24.

In general, the first end 21 of the metal plate member 20 can act as a stationary electrical contact since it is made of conductive material.

Moreover, in an embodiment, the stationary electrical contact 22 is made in the form of a plate that is made up of a highly conductive metal, like for example silver, and it is fixed to the first end 21 of the metal plate member 20 by means of welding or by means of screws or other fixing means.

In an embodiment, the protection device 10 comprises a composite metal blade 30.

In an embodiment, the composite metal blade indicates a blade that is made up of two or more blades of different metals that are coupled to one another.

In one embodiment of the present invention, the composite metal blade 30 is a bimetallic blade.

The composite metal blade 30 has, at a first end 31, a movable electrical contact 32 and, at a second end 33, a second electric connection terminal 34.

The movable electrical contact 32 of the composite metal blade 30 is suitable for making with the stationary electrical contact 22 an electric switch.

In detail, the composite metal blade 30 and the metal plate member 20 are arranged so that the switch results to be normally closed.

When the switch is closed, the composite metal blade 30 and the metal plate member 20 are connected in series and, therefore, are passed through by the same electrical current.

The composite metal blade 30 is advantageously configured for deforming until snapping from a closing position, in which the switch is closed, to an opening position, in which the switch is open, when the temperature around the composite metal blade 30 exceeds a higher temperature threshold value.

Such a composite metal blade 30 is moreover advantageously configured so as to return to the closing position when the temperature around the composite metal blade 30 falls below a lower temperature threshold value.

In particular, the composite metal blade 30 is capable of changing position thanks to the different thermal expansion to which the metals forming it are subjected.

In an embodiment, on the composite metal blade 30 there is a boss 35 so as to define two stable positions, an opening position and a closing position. The composite metal blade 30, indeed, as a response to an increase or to a decrease in the temperature exceeding the aforementioned thresholds, tends to bend up to a point that the boss 35 changes curvature moving the blade itself into a stable position.

In such a way, the switch made by the composite metal blade 30 and by the metal plate member 20 is very effective in its action and it avoids the risks of dangerous electric arcs formation between the contacts.

The aforementioned higher and lower temperature threshold values, as well as the opening/closing velocity of the switch, vary according to the dimensions and to the physical characteristics (thermal expansion coefficient, resistivity and so on) of the metals forming the composite blade 30.

In general, the first end 31 of the composite metal blade 30 can act as a movable electrical contact since it is made of conductive material.

In an embodiment, the movable electrical contact 32 is made in the form of a plate that is made of a highly conductive metal, like for example silver, and is fixed to the first end 31 of the composite metal blade 30 by means of welding or by means of screws or other fixing means.

The protection device 10, moreover, comprises an insulating block 40 for supporting the metal plate member 20 and the composite metal blade 30, visible in FIG. 4.

Such an insulating block 40 can be made as a single piece or in two or more parts assembled together.

In the case in which the insulating block 40 is made as a single piece, it is directly overmoulded on the connection terminals 24 and 34 so as to leave them projecting outside such a block 40 from the opposite side with respect to that of the switch.

In such a way, the insulating block 40 is stronger with respect to the case in which it is made of several parts that are coupled together. This, moreover, simplifies the mounting operations of the entire protection device 10.

The insulating block 40 can be made up of plastic or ceramic or of any other electrical insulating material.

According to an embodiment of the present invention, the protection device 10 comprises a compensating resistor 25 made en bloc with the metal plate member 20 between the stationary electrical contact 22 and the first connection terminal 24.

The presence of the compensating resistor 25, therefore, makes the protection device 10 sensitive not only to the temperature around the blade 30, but also to the electrical current that flows in the plate member 20, as well as in the blade itself 30. Indeed, the resistor is made so that, when it is passed through by an electrical current that is greater than a higher threshold value of current, it disperses so much heat that the temperature around the blade increases exceeding the higher temperature threshold value.

The sensitivity to electrical current, namely the higher threshold value of current exceeded which the switch snaps into the open position, is determined by setting the electric resistance value of the compensating resistor 25.

Such a compensating resistor 25, moreover, is positioned in a fixed and certain manner with respect to the composite metal blade 30 giving the protection device 10 a highly repeatable behaviour.

Figure 3:
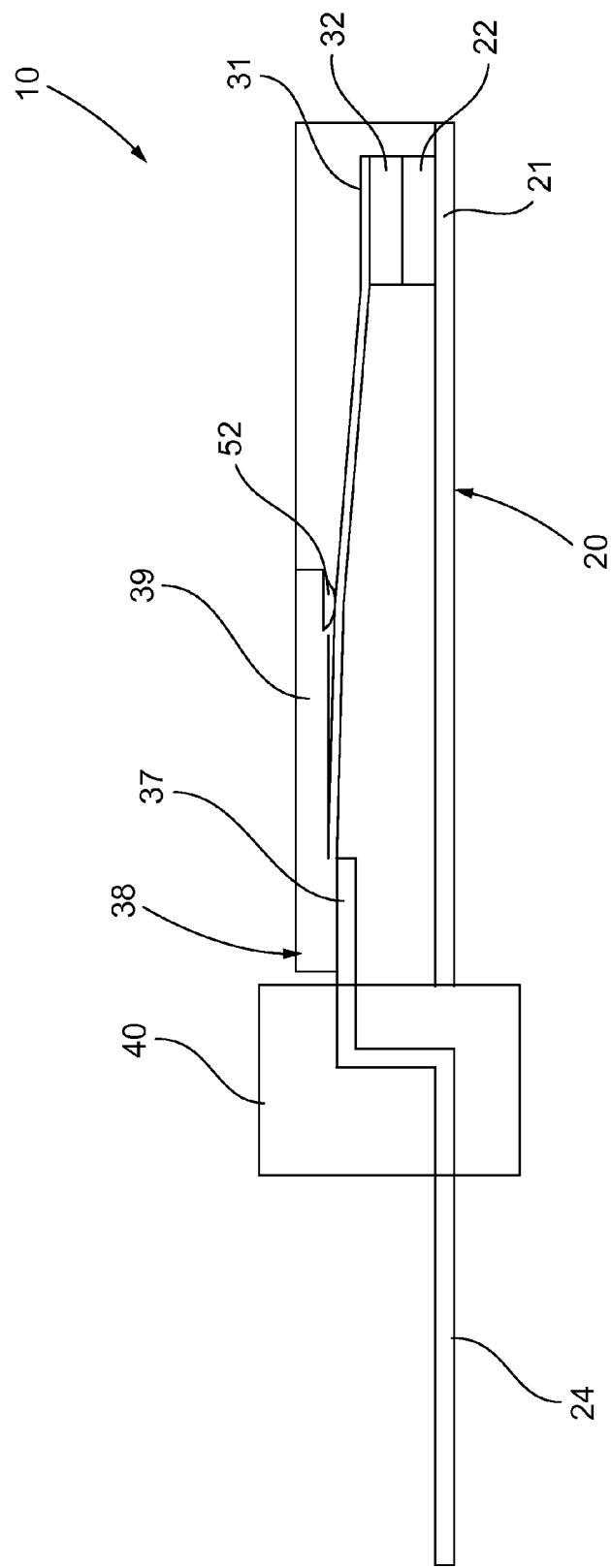
FIG. 3 is a side section view of a protection device for electrical appliances according to an embodiment of the present invention.

In particular, as visible in FIG. 3, the insulating block 40 is constrained to the metal plate member 20 so that the latter projects out cantilevered with respect to the insulating block itself 40, leaving the compensating resistor 25 free. In such a way, the compensating resistor 25 is not in direct contact with any insulating body and, therefore, heat dissipation only occurs through the compensating resistor 25 itself which in the central part can reach very high temperatures (even red heat) without damaging the insulating block. This makes it possible to obtain a greater sensitivity for the protection device 10 with respect to the cases in which the compensating resistor is in contact with insulating bodies.

The compensating resistor 25 can be made in different forms. In any case, the composite metal blade 30 in an embodiment has a surface area that is suitable for covering the compensating resistor 25; in such a way the sensitivity of the blade 30 to heat generated by the compensating resistor 25 is increased.

In an embodiment, the compensating resistor 25 is coil-shaped, as visible in FIG. 1, so as to make the protection device 10 more compact.

In any case, with a single moulding operation the metal plate member 20 and the compensating resistor 25 integrated in it are obtained.

This simplifies the production of compensating resistors having different electrical resistance values.

Indeed, by varying the material with which the metal plate member 20 is made or the pitch of the coil or the thickness of the metal plate member 20 different useful electrical resistance values are obtained for protecting electrical appliances from overloads caused both by very low currents, for example lower than 1 A, and by very high currents, for example higher than 40 A.

In an embodiment, the metal plate member 20 can be made up of materials ranging from metals with low resistivity, like for example aluminium, brass and so on, to high resistivity metals, like for example stainless steel, nickel alloy and chromium and so on.

In the embodiment of the present invention illustrated in FIG. 4, the protection device 10 comprises a metal supporting member 36 that on one side defines the second electric connection terminal 34 and on the opposite side it defines a supporting portion 37 that is constrained to the composite metal blade 30 by means, for example, of welding. In particular, the metal supporting member 36 is shaped so that the supporting portion 37 lies on a different plane from that on which the second terminal 34 lies.

In an embodiment, the electric connection terminals 24 and 34 are of the fast-on type and, as visible in FIG. 4, are assembled so as to be in a side by side and coplanar position to each other.

More in general, the electric connection terminals 24 and 34 can be of the wire-crimping type or they can be terminals of the plug-on type which are welded to the ends of the metal supporting member 36 and of the metal plate member 20.

In an embodiment, the protection device 10 comprises an abutment metal plate 38 that is fixed to the composite metal blade 30 on the opposite side with respect to the supporting portion 37, so as to keep the composite metal blade 30 stably in position during the normal operation of the device and especially during the state changes of the switch.

In this case, therefore, the abutment metal plate 38 is constrained to the blade 30 at the coupling with the supporting portion 37 so as to form a sandwich configuration.

In an embodiment, the abutment metal plate 38 comprises a fin 39 developing lengthwise towards the first end 31 of the composite metal blade 30 and resting on the latter through a protrusion 52 defining, on the surface of the blade 30, the pivot point of deformation of this latter.

In an embodiment, the protection device 10 can comprise a protecting casing 50 that is constrained to the insulating block 40 on the side of the electric contacts 22 and 32 so as to enclose in its inner volume at least partially the composite metal blade 30 and the metal plate member 20.

In an embodiment, the coupling between the insulating block 40 and the protecting casing 50 occurs through the snap-engagement between a projecting portion 41 of the insulating block 40 and a corresponding seat 51 for receiving the protecting casing 50.

In general, such a coupling can occur by means of snap-fitting or by using connection means of the per se known type.

In an embodiment of the present invention, the metal plate member 20 comprises a lateral frame portion 27 that is provided at the end thereof with a cantilevered transverse portion 26 supporting the stationary electrical contact 22.

The lateral frame portion 27, as visible in FIG. 4, in an embodiment extends in length at least for the entire extension of the compensating resistor 25.

In such a case, therefore, the first end 21 of the metal plate member 20 coincides with the cantilevered transverse portion 26.

In such a case, therefore, the cantilevered configuration of the transverse portion 26 makes it possible to obtain a drastic reduction in the bouncing effect that occurs between the two electric contacts 22 and 32 when the switch closes.

Indeed, thanks to the aforementioned configuration, the transverse portion 26 has a high elasticity and, therefore, it is capable of elastically absorbing the kinetic return energy given off following the closure of the switch.

The reduction in the aforementioned bouncing effect leads to less wearing of the electric contacts 22 and 32 and less mechanical stress of the composite metal blade 30; such advantageous effects make it possible to lengthen the average life of the contacts and overall of the protection device 10.

Moreover, the reduction in the bouncing effect furthermore reduces the risk of electric arcs formation while the switch closes.

In an embodiment, the protection device 10 is provided with a covering shell (not illustrated) that is suitable for containing the device itself leaving outside only the electric connection terminals 24 and 34.

According to the application requirements, such a covering shell can be hermetic or sealed tight and it can be made of plastic or ceramic or metal and so on.

Let us consider, for example, the case in which the protection device 10 is connected to a winding of an electric single phase motor that is started by means of an auxiliary starting winding that is connected through interposition of a thermal switch of the PTC type.

In such a case, the protection device 10 is configured so as to have a closing time that is greater than the resetting time of the PTC switch.

In such a case, therefore, the covering shell is made of a material with low thermal conductivity.

The operation of the protection device 10 for electrical appliances is as follows.

As anticipated above, in the rest of the description we shall refer to the application of the device in an electric motor although it could also be applied to any electric appliance.

The protection device 10 is interposed between the power supply line and the winding to be protected.

When the temperature around the blade 30, or the current that has been absorbed by it, exceed a certain higher threshold temperature or current value, respectively, the composite metal blade 30 snaps into the opening position thus interrupting the power supply of the winding and protecting the latter from possible overloads.

In such a way, the air around the blade cools down until its temperature falls below a lower temperature threshold and the blade 30 again snaps returning into the closing position and again allowing the winding to be power supplied.

From the description made the characteristics of the protection device for electrical appliances object of the present invention should be clear, just like the relative advantages should also be clear.

Indeed, by making the compensating resistor en bloc with the metal plate member ensures that there is high repeatability in the dynamic behaviour of the switch made by the protection device, or rather of the opening/closing velocity of such a switch at a certain temperature or at a certain current.

The compensating resistor that is integrated in the metal plate member is moreover closer to the composite metal blade with respect to known devices, making it possible to obtain a more effective heat transfer to the blade itself.

A further improvement of the heat transfer from the compensating resistor to the blade is obtained thanks to the fact that the blade has an extension such as to completely cover the surface that is occupied by the resistor.

Moreover, according to an embodiment of the present invention, it is possible to make compensating resistors that are characterised by different resistance values, by varying the shape and/or the section and/or the material that makes the metal plate member without changing the overall dimensions of such an element moreover preventing the protection device from being weaker.

Since the metal plate member is made by means of a moulding process, in order to vary the aforementioned resistance values it is sufficient to supply the moulding machine with loads of different metal material or material with a different thickness or to arrange the machine itself with moulds having different shapes.

The positioning of the movable electrical contact on the cantilevered transverse portion, moreover, makes it possible to lengthen the average life of the device due to the fact that such a transverse portion, being mounted cantilevered on the lateral portion, has greater elasticity thanks to which it at least partially absorbs the kinetic bouncing energy of the composite metal blade following closure of the switch.

Finally, it is clear, that the device thus conceived can undergo numerous modifications and variants, all covered by the invention; moreover, all the details can be replaced by technically equivalent elements. In practice the materials used, as well as the dimensions, can be any according to the technical requirements.

What is claimed is:

1. A protection device for electric appliances, in particular electric motors, compressors and transformers, suitable for selectively connecting an electric appliance to a power supply line comprising:

a metal plate member having at a first end a stationary electrical contact and at a second end a first electric connection terminal;

a composite metal blade having at a first end a movable electrical contact and at a second end a second electric connection terminal, said movable electrical contact making with said stationary electrical contact an electric switch having an opening position and a closing position, said composite metal blade being configured for deforming until snapping from the closing position to the opening position when temperature around said composite metal blade exceeds a higher temperature threshold value, and configured for deforming until snapping from the opening position to the closing position when the temperature around said composite metal blade falls below a lower temperature threshold value;

an insulating block for supporting said metal plate member and said composite metal blade; and a compensating resistor made en bloc with said metal plate member between said stationary electrical contact and said first connection terminal, said insulating block being constrained to said metal plate element so that the latter projects cantilevered with respect to the insulating block itself leaving said compensating resistor free.

2. The protection device for electrical appliances according to claim 1, wherein said composite metal blade comprises a surface area suitable for covering said compensating resistor.

3. The protection device for electrical appliances according to claim 1, wherein said compensating resistor is coil-shaped.

4. The protection device for electrical appliances according to claim 1 wherein said composite metal blade is a bimetallic blade.

5. The protection device for electrical appliances according to claim 1, further comprising:

a metal supporting member defining on one side said second electric connection terminal and on the opposite side a supporting portion constrained to said composite metal blade, said supporting portion lying on a plane different from that on which said second terminal lies.

6. The protection device for electrical appliances according to claim 5, wherein said insulating block is constrained to said metal supporting member and to said metal plate member so that said first and second electric connection terminals are arranged in a side by side and coplanar position to each other protruding with respect to said insulating block from the opposite part to that of said electrical contacts.

7. The protection device for electrical appliances according to claim 5, further comprising an abutment metal plate fastened to said composite metal blade on the opposite side with respect to said supporting portion so as to keep in position said composite metal blade.

8. The protection device for electrical appliances according to claim 7, further wherein said abutment plate further comprises a fin developing lengthwise towards said first end of said composite metal blade and resting on it through a protrusion defining on said composite metal blade the pivot point of deformation of this latter.

9. The protection device for electrical appliances according to claim 1, further comprising a protecting casing constrained to said insulating block on the side of said electrical contacts so as to at least partially enclose in its inner volume said composite metal blade and said metal plate element.

10. The protection device for electrical appliances according to claim 1, wherein said metal plate element further comprises a lateral rigid portion provided at the first end thereof with a cantilevered transverse portion supporting said stationary electrical contact.

11. The protection device for electrical appliances according to claim 1, further comprising a covering shell suitable for containing said device leaving said electric connection terminals outside.

* * * * *